March 7, 1933.  R. A. LABINE  1,900,450
METHOD OF APPLYING COVERING MATERIAL TO TIRE PATCHES
Filed March 3, 1930  2 Sheets-Sheet 1
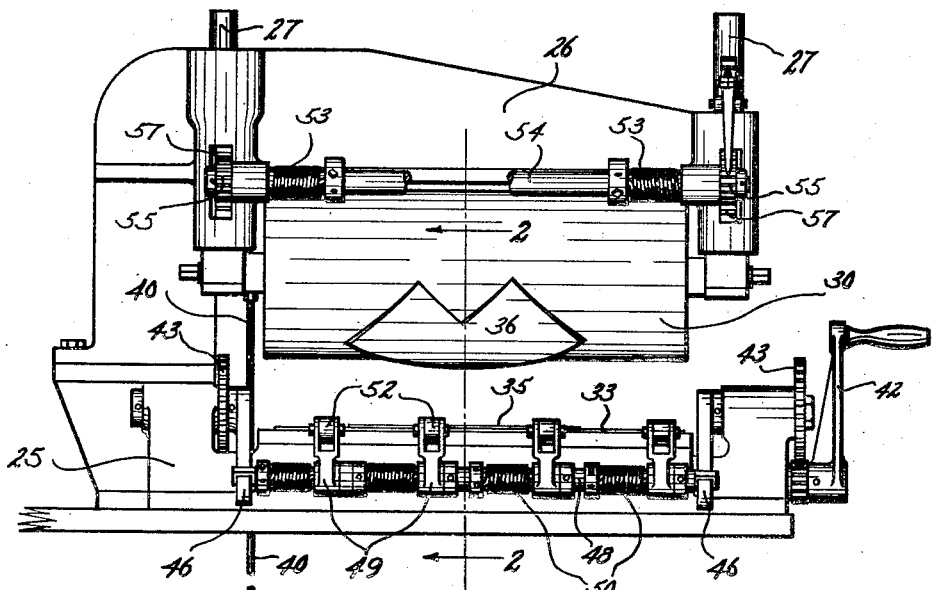
Fig. 1.
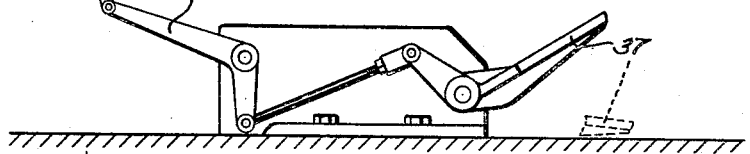
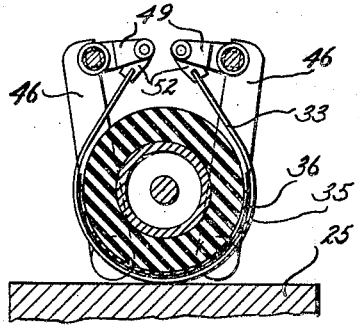
Fig. 4.
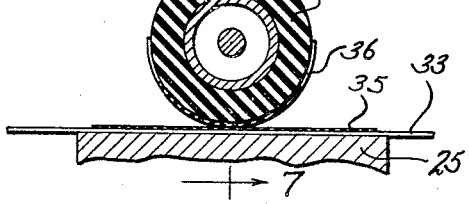
INVENTOR.
Roland A. Labine.
BY
ATTORNEY.

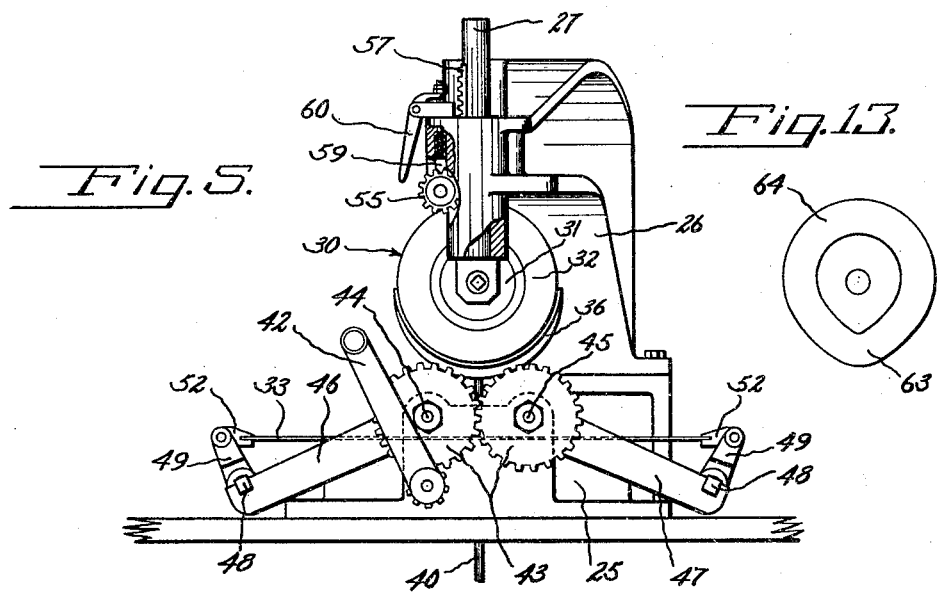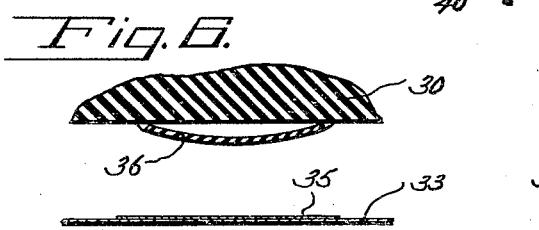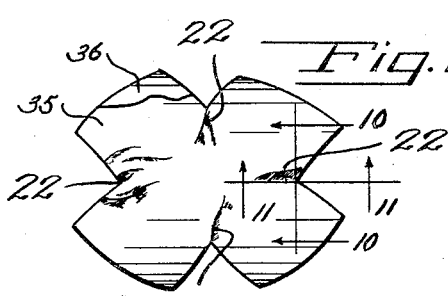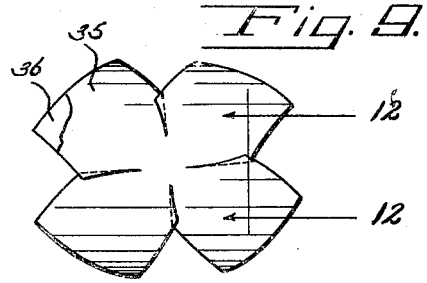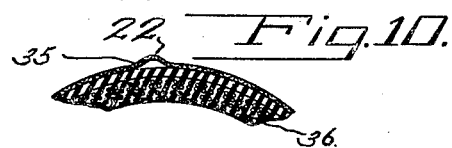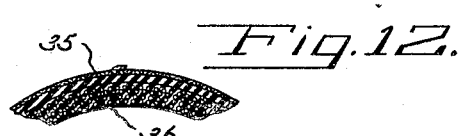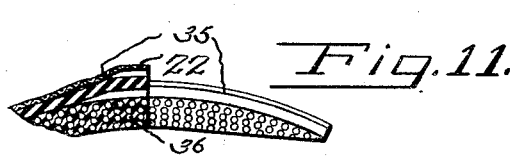

Patented Mar. 7, 1933

1,900,450

UNITED STATES PATENT OFFICE

ROLAND A. LABINE, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS

METHOD OF APPLYING COVERING MATERIAL TO TIRE PATCHES

Application filed March 3, 1930. Serial No. 432,592.

My invention relates generally to the manufacture of repair patches for use inside of tire casings and more particularly to a method of and the apparatus for applying a sheet of covering material to such patches. A covering, having an air-tight surface, is needed to protect the adhesive outer surface applied to the patch to enable it to stick to the inside of a casing without the application of cement at the time the repair is made. Holland or shade cloth is a suitable material for the purpose.

The patches are prepared in the shape of the interior of the tire casing, being curved in two directions, thus making it difficult in the commercial manufacture of patches of this character to apply a layer of fabric to them without distortion or considerable wrinkling of the fabric. Wrinkling of this fabric not only mars the appearance of the patch, but also provides an opening between the fabric and the adhesive outer surface. This opening will allow air to come in contact with the adhesive surface at the wrinkled portion causing it to become air-cured and "bloomed" and thus tending to cause it to lose its adhesiveness.

One object of my invention is to provide a method by which the covering material may be applied to a double-curved patch without wrinkling.

Another object is to provide an apparatus for applying the material to a patch curved in one or more directions.

Other objects will be apparent from the following specification and claims.

In the accompanying drawings which illustrate one embodiment of my invention,

Fig. 1 is a side view of my apparatus showing a patch curved in two directions positioned on the apparatus previous to the applying operation;

Fig. 2 is a detail view taken substantially on line 2—2 of Fig. 1;

Fig. 3 is a similar view showing the patch brought into contact with material;

Fig. 4 is a similar view showing the completion of the material applying operation;

Fig. 5 is a front view of the apparatus with parts in position as in Fig. 1;

Fig. 6 is a detail view taken substantially on line 6—6 of Fig. 2;

Fig. 7 is a detail view taken substantially on line 7—7 of Fig. 3;

Fig. 8 is a view of a patch showing wrinkled material;

Fig. 9 is a view of a patch showing covering material applied by my improved method;

Fig. 10 is a section on an enlarged scale taken substantially on line 10—10 of Fig. 8 and showing a wrinkle in the material;

Fig. 11 is a similar view showing the wrinkle from another angle;

Fig. 12 is a view taken substantially on line 12—12 of Fig. 9; and

Fig. 13 is a modified form of a compression member.

In my improved method of applying a covering to a tire repair patch which is curved in two directions, as for example, a section of a sphere, I first temporarily press out one of the two curves and then, starting at the center of the patch, progressively press or stitch a piece of covering material, of sufficient size to entirely cover the patch, over the patch. The covering material is then immediately slit as shown in Fig. 9, the material being of sufficient strength to hold the patch in the applying position for a short time. After the material is slit the patch will gradually draw itself into its normal position, one slit edge 20 then sliding over the adjoining edge, thus taking up the amount of the covering material that would otherwise become wrinkled as shown at 22 in Figs. 8, 10 and 11.

One side of the covering material is preferably coated with raw gum stock, this portion being that which is applied to the patch and, when the patch is inserted in a tire, is the means by which the patch adheres to the tire. This gum stock, however, may be applied to the patch previous to the application of the covering material which may then be applied directly, that is, without another coating of gum stock. The covering material may also be applied to the patch with or without gum stock already slit as described but, as the positioning of the material to the patch may be more expediently performed if the slits are made following the application, I prefer to do it in this manner.

As previously explained, the proper positioning of a piece of covering material to a double-curved patch is most easily accomplished if one of its two curves is straightened out temporarily. To do this I have provided an apparatus as shown in the drawings. This apparatus comprises a bed plate 25 onto which is fastened an arm 26 supporting, by means of guide pins 27, a compressing member 30. This member, made of a core 31 covered with yieldable material such as sponge rubber 32, is preferably made in contour substantially equal to the contour of one of the curves in the patch to be covered. The compressing member 30, when in inoperative position, is supported by the pins 27 a short distance above the bed plate 25 over which is stretched an apron 33 tautly held as will be later described. This apron is preferably made of sheet brass or other similar material which may be repeatedly flexed without danger of breaking.

In operation a piece of covering material 35, of sufficient size to completely cover the patch to which it is to be applied, is placed on the apron 33 directly below the roll 30. A patch 36 is then placed in the center of the covering material so that the axis of one curve of the patch is in line with the axis of the compression member 30. Instead of placing the patch on the covering material the patch may, if desired, be held in that same position against the member 30. By stepping on a foot treadle 37 connected through a bell crank 38 and rods 39 and 40 to the compression member 30 this member is brought down against the apron 33 firmly, forcing one curve of the patch 36 to be straightened out (see Figs. 2, 3, 6 and 7) when pressed between the member 30 and the apron 33.

As the covering material is thus firmly held to the patch the ends of the apron 33 are brought around the member 30 (Fig. 4), thus bringing the covering material over the remainder of the patch. This apron is brought to this position through the operation of a crank 42 which operates meshing gears 43 keyed on shafts 44 and 45 carried by the bed plate 25. Also keyed to the shafts 44 and 45 are arms 46 and 47 carrying at their ends bars 48. Each bar 48 carries a number of tension arms 49 which are constantly being stressed outward by springs 50. Pivoted to each of the arms 49 is a clamp 52 adapted to grip the apron 33.

The apron is then straightened out again through the reverse movement of the crank 42 and the member 30 is brought to its inoperative position, thus allowing the removal of the patch 36 which is now covered with material. This material is trimmed even with the edges of the patch and slit as previously described.

The compression member 30 is normally held in inoperative position (Figs. 1 and 5) by springs 53 on a shaft 54 mounted in the arm 26. This shaft 54 carries a gear 55 at either end meshing with a rack 57 on each rod 27. Since the positioning of the member 30 is done only from one end of the member the rack and gear mechanism will insure equal movement at both ends of the member 30 without the danger of cramping.

In order that the operator will not be required to hold the treadle down to keep the member 30 firmly against the apron, I have provided a lock mechanism co-acting with one of gears 55. This mechanism consists of a spring controlled pin 59 allowing clockwise movement of gear 55 (as shown in Fig. 5) but preventing its counter-clockwise motion. Thus the member 30 may be brought downward but prevented from upward movement until the pin 59 is withdrawn. A release lever 60 operably connected to the pin 59 is provided to withdraw the pin 59 sufficiently to allow the gear 55 to rotate counter-clockwise. The springs 53 not only hold the member 30 in inoperative position, but also draw the member 30 into that position upon the release of the pin 59.

Figs. 2, 3 and 4 show progressively the steps in applying covering material to a double-curve patch by my improved method.

Fig. 13 is a view of a compression member for use on patches of different size groups, portion 63 for the smaller sizes and portion 64 for the larger. It will be understood, however, that a compression member may be constructed to accommodate varying sizes of patches.

Having thus described my invention, I claim:

1. A method of applying covering material to a double-curved repair patch which comprises straightening one of the curves in the patch temporarily, positioning the dome portion of the patch on a sheet of covering material, progressively pressing the material around the patch at either side of the dome portion, trimming the material to the shape of the patch, and slitting the material at four opposed portions of the patch, said slits extending from near the dome of the patch to the edges.

2. A method of applying covering material to a double-curved repair patch which comprises straightening one of the curves in the patch during the applying operation, positioning the dome portion of the patch on a sheet of material, progressively pressing the material around the patch at either side of the dome portion, and slitting the material at a plurality of opposed portions of the patch, said slits extending from near the dome of the patch to the edges.

3. A method of applying covering material to a double-curved repair patch which comprises straightening one of the curves in the patch temporarily, positioning the dome portion of the patch at the center of a sheet of material, said material being slitted at a plurality of opposed sections starting near the center of the sheet and terminating at the edges, and progressively pressing the material around the patch at either side of the dome portion.

4. A method of applying covering material calendered with a sheet of uncured rubber to a double-curved repair patch which comprises straightening one of the curves in the patch during the applying operation, positioning the dome portion of the patch on the rubber side of a sheet of rubber coated material, progressively pressing the rubber coated material around the patch at either side of the dome portion, and slitting the material at a plurality of opposed portions of the patch, said slit extending from near the dome of the patch to the edges.

ROLAND A. LABINE.